United States Patent [19]

Glenn

[11] Patent Number: 4,792,854
[45] Date of Patent: Dec. 20, 1988

[54] APPARATUS FOR TEMPORALLY PROCESSING A VIDEO SIGNAL

[75] Inventor: William F. Glenn, Fort Lauderdale, Fla.

[73] Assignee: New York Institute of Technology, Old Westbury, N.Y.

[21] Appl. No.: 153,580

[22] Filed: Jan. 29, 1988

Related U.S. Application Data

[60] Continuation of Ser. No. 947,979, Dec. 31, 1986, abandoned, which is a division of Ser. No. 661,656, Oct. 17, 1984, Pat. No. 4,652,909, which is a continuation-in-part of Ser. No. 597,482, Apr. 6, 1984, which is a continuation-in-part of Ser. No. 483,126, Apr. 8, 1983, Pat. No. 4,628,344, which is a continuation-in-part of Ser. No. 418,055, Sep. 14, 1982, Pat. No. 4,517,597.

[51] Int. Cl.$^4$ .............................................. H04N 5/14
[52] U.S. Cl. ...................................... 358/160; 358/167
[58] Field of Search ...................... 358/11, 12, 13, 21, 358/37, 133, 167, 160

[56] References Cited

U.S. PATENT DOCUMENTS

| | | | |
|---|---|---|---|
| 3,665,097 | 5/1972 | Macovski | 358/93 |
| 3,920,889 | 11/1975 | Connor | 358/166 |
| 4,231,065 | 10/1980 | Fitch et al. | 358/166 |
| 4,268,855 | 5/1981 | Takahashi | 358/36 |
| 4,291,333 | 9/1981 | Warnock et al. | 358/36 |
| 4,298,887 | 11/1981 | Rode | 358/113 |
| 4,335,395 | 6/1982 | Clarke | 358/11 |
| 4,339,803 | 7/1982 | Michael et al. | 364/724 |
| 4,350,998 | 9/1982 | Verhoeven | 358/111 |
| 4,375,650 | 3/1983 | Tiemann | 358/133 |
| 4,394,684 | 7/1983 | Verhoeven | 358/111 |
| 4,399,461 | 8/1983 | Powell | 358/166 |
| 4,423,927 | 1/1984 | Bly | 351/331 |
| 4,456,926 | 6/1984 | Kruger et al. | 358/111 |
| 4,461,025 | 7/1984 | Franklin | 381/56 |
| 4,543,607 | 9/1985 | Taylor et al. | 358/105 |
| 4,551,753 | 11/1985 | Nishizawa et al. | 358/140 |
| 4,561,012 | 12/1985 | Acampora | 358/13 |

FOREIGN PATENT DOCUMENTS

| | | | |
|---|---|---|---|
| 2072991 | 10/1981 | United Kingdom | 358/31 |
| 2135850 | 9/1984 | United Kingdom | 358/166 |

*Primary Examiner*—John W. Shepperd
*Attorney, Agent, or Firm*—Martin M. Novack

[57] ABSTRACT

An apparatus is disclosed for temporally processing video signals. A temporal filter is used which enhances temporal response of video at around the peak of the human vision transient system's temporal response (which is around 10 Hertz), and results in moving images which appear sharper.

2 Claims, 2 Drawing Sheets

APPARATUS FOR TEMPORALLY PROCESSING A VIDEO SIGNAL

This is a continuation of U.S. application Ser. No. 947,979 filed on Dec. 31, 1986, now abandoned which is a divisional of U.S. patent application Ser. No. 661,656, filed Oct. 17, 1984. Said U.S. patent application Ser. No 661,656, now U.S. Pat. No. 4,652,909, was a continuation-in-part of U.S. patent application Ser. No. 597,482 filed 4/6/84 (a continuation of which became U.S. Pat. No. 4,701,783), which was, in turn, a continuation-in-part of U.S. patent application Ser. No. 483,126, filed 4/8/83 now U.S. Pat. No. 4,628,344, which was, in turn, a continuation-in-part of U.S. patent application Se. No. 418,055, filed 9/14/82 now U.S. Pat. No. 4,517,597.

BACKGROUND OF THE INVENTION

This invention relates to techniques for processing television signals and, more particularly, to an apparatus for temporally processing video signals to improve their appearance.

As described in the above-identified related applications, an electronic video signal (television signal) can be encoded at reduced bandwidth by lowering the frame refresh rate of the high spatial frequency components, while maintaining the frame refresh rate of at least a portion of the low spatial frequency components at the standard rate. If done in a specified manner, this will not cause substantial degradation in the ultimately displayed image, since human vision cannot perceive changes in high spatial resolution information at as fast a rate as it can perceive changes in low spatial resolution information. Accordingly, as has been previously set forth, an electronic video encoding and decoding system can be devised which takes advantage of this, and other, characteristics of human vision by encoding higher spatial resolution video components to be at a temporal information rate which approximately corresponds to the highest rate actually perceived by human vision for such components; thereby eliminating the need to encode these components at a higher rate, which inherently wastes bandwidth. Also, as shown in the prior copending applications, the low spatial resolution information can be generated in a form which is compatible with standard television video, e.g. NTSC video.

It is among the objects of the present invention to provide an improved apparatus for temporally filtering video signals in general and in the described reduced bandwidth type of system. In accordance with the invention, an apparatus is disclosed for temporally processing video signals. A temporal filter is used which enhances temporal response of video at around the peak of the human vision transient system's temporal response (which is around 10 Hertz), and results in moving images which appear sharper.

SUMMARY OF THE INVENTION

Further features and advantages of the invention will become more readily apparent from the following detailed description when taken in conjunction with the accompanying drawings.

DESCRIPTION OF THE PREFERRED EMBODIMENTS

In the description hereof, the teachings of U.S. Pat. Nos. 4,652,909, which matured from a parent application hereof, as well as the teachings of the other referenced applications hereof, are incorporated by reference.

Figure 1:
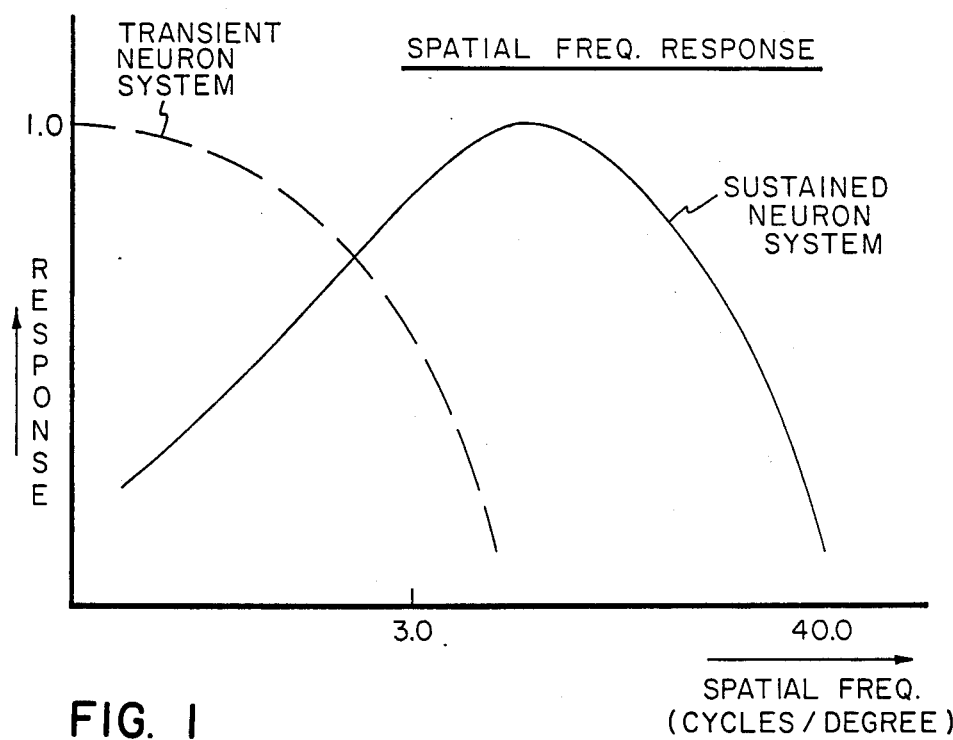
FIG. 1 is a graph of the spatial frequency response of the transient neuron system and the sustained neuron system of human vision.
Figure 2:
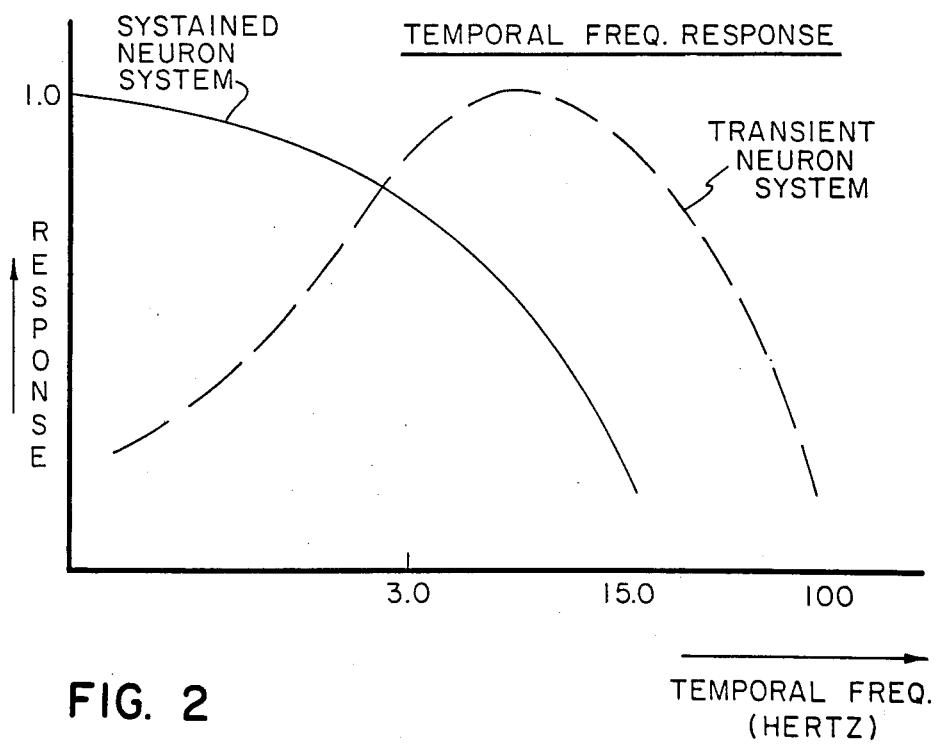
FIG. 2 is a graph of the temporal frequency response of the transient neuron system and the sustained neuron system of human vision.

As described in detail in copending U.S. patent application Ser. No. 597,482, a continuation of which is now U.S. Pat. No. 4,701,783, assigned to the same assignee as the present application, it has been found that two different types of neuron systems or channels are used in vision. One type of neuron system, which detects low resolution imagery is relatively sensitive to temporal transients and has a time constant for build-up and decay of information that is believed to be about 40 to 80 milliseconds. A second type of neuron system is apparently used for transmitting relatively high resolution information from the fovea. This neuron system is believed to have a time constant of about 200 to 350 milliseconds. FIGS. 1 and 2 show the spatial and temporal response of these two systems in humans. These channels have been referred to as "transient" and "sustained" neuron systems. The sustained system is specialized for pattern detection. It has a relatively poor temporal response but relatively good resolution. The transient system is specialized for motion detection. It has relatively poor resolution but relatively good temporal response. In addition to the normal response, a transient caused by motion reduces perception in both systems for a period of about 300 milliseconds. As described in the referenced copending U.S. Patent Applications, an encoding system can be designed to have spatial and temporal characteristics which match the human visual system, and results in a saving of bandwidth.

Applicant has determined that an important factor in the observed loss of sharpness of moving television images (as described in the parent application hereof, now U.S. Pat. No. 4,652,909) is that the television camera, for the low resolution image, has a reduced rather than increased high temporal frequency response (as does the transient neuron system of human vision—see FIG. 2). Accordingly, by selectively enhancing the temporal response of the low (or standard) resolution camera at around the peak of the human vision transient system's temporal response, which is around 10 Hertz, one can obtain moving images which appear sharper. To obtain a filter with a relatively flat temporal response and sharp cutoff, one can utilize a series of preferably at least three frame stores with both positive and negative coefficients that approximate the function (sin x)/x.

Figure 3:
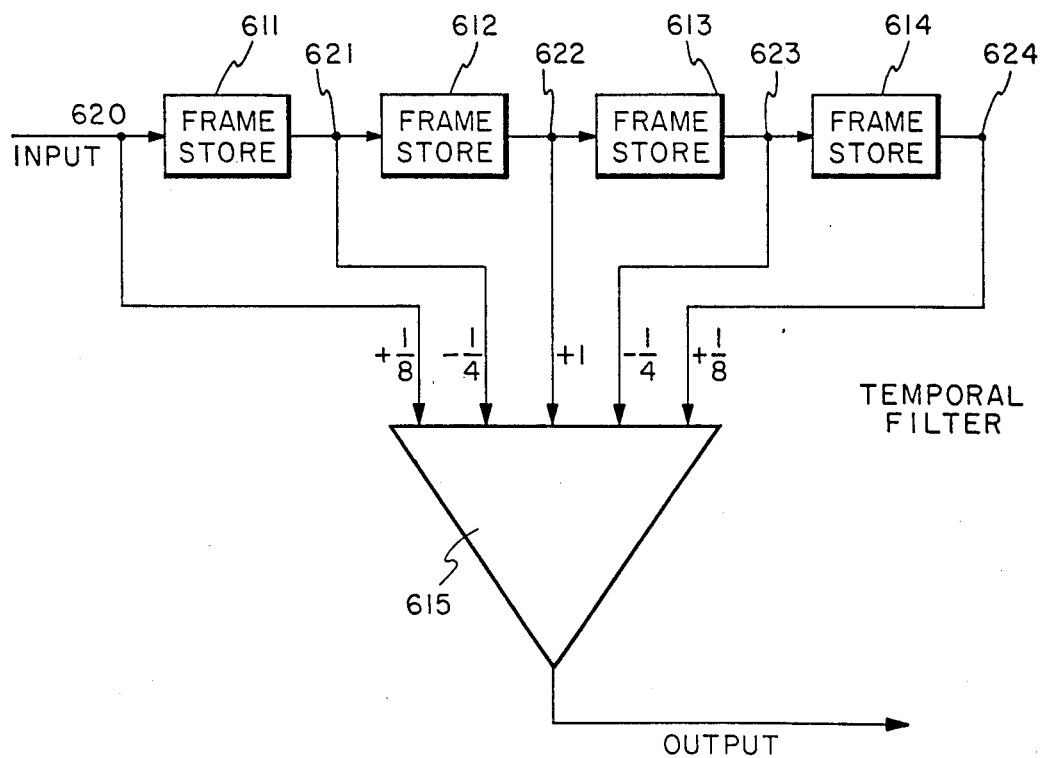
FIG. 3 is a block diagram of an enhancing temporal filter in accordance with a form of the invention.

Referring to FIG. 3, there is shown an example of a temporal filter of the type which may be utilized in the embodiment of FIG. 4 as set forth in said U.S. Pat. No. 4,652,909, or the other forms of the invention, as well as in systems of the type described in the above-reference copending U.S. Patent Applications, or in conventional television systems, for providing temporal enhancement of video signals. Four frame stores 611, 612, 613 and 614 are arranged in a series arrangement, with the input signal being coupled into this series string via frame store 611. The terminal at the input of frame 611 is designated 620, and the terminals at the outputs of frame stores 611, 612, 613 and 614 are respectively designated by reference numerals 621, 622, 623 and 624. The five illustrated terminals are coupled to respective weighted inputs of summing amplifier 615. In the indicated example, the central terminal 622 (which can be considered, for purposes of understanding, as the real time image) is applied to the summing amplifier with a weight $+1$. The signals from adjacent terminals (i.e., separated in time from the real time image by one frame lead and one frame lag) are each applied to the summing amplifier 615 with respective weights of $-\frac{1}{4}$. Also, the signals from terminals 620 and 624, which respectively lead and lag the real time image by two video frames, are each applied to the summing amplifier 615 with a weight of $+\frac{1}{8}$.

In operation, the described temporal filter provides enhancement temporally in the low definition channel in a manner that is somewhat like what an image enhancer does spatially by subtracting signal on either side of an elemental region where detail is to be emphasized.

The embodiment of FIG. 3 utilizes four frame stores, and with the weights set forth will provide a peak temporal response slightly above 10 Hz. The peak response can be lowered by using more frame stores, and the weighting factors can be selected to further tailor the enhancement to the peak temporal response of the eye, while maintaining a desirable response curve shape.

The invention has been described with reference to particular preferred embodiments, but variations within the spirit and scope of the invention will occur to those skilled in the art. Suitable equalizing delays can be provided in the various embodiments, as necessary. Further, while certain of the techniques hereof are illustrated in the context of video recording systems, it will be understood that these techniques may also have application with respect to direct display and/or transmission and/or recording on other types of storage media.

I claim:

1. Apparatus for receiving frames of an input video signal and temporally processing the video signal, comprising:
    a string of at least three frame store devices connected in series arrangement;
    means for applying said video signal to the first frame store device of said series string;
    a combining circuit having at least four weighted inputs;
    means for applying the outputs of said frame store devices and said input video signal to said combining circuit, at least two of said frame store device outputs being applied with a negative weight, and at least some of said frame store device outputs being applied with a positive weight;
    the number of frame store devices in the string and the weightings of said combining circuit being selected such that the output of said combining circuit has an increased temporal response with respect to all other temporal frequencies, as compared to said input video signal, in the temporal frequency range around approximately 10 Hertz, whereby the temporal frequency response is enhanced in the range in which the human eye has maximum responsiveness.

2. Apparatus as defined by claim 1, wherein said string of at least three frame stores comprises four frame stores and said combining circuit has five weighted inputs.

* * * * *

UNITED STATES PATENT AND TRADEMARK OFFICE
CERTIFICATE OF CORRECTION

PATENT NO. : 4,792,854

DATED : December 20, 1988

INVENTOR(S) : William E. Glenn

It is certified that error appears in the above—identified patent and that said Letters Patent is hereby corrected as shown below:

col. 1, move the heading "SUMMARY OF THE INVENTION" to col. 1, line 51 col. 3, line 33, delete the last two sentences of the Specification

Signed and Sealed this

Twenty-seventh Day of June, 1989

Attest:

DONALD J. QUIGG

Attesting Officer

Commissioner of Patents and Trademarks